(12) United States Patent
Kruglick

(10) Patent No.: US 8,456,620 B2
(45) Date of Patent: Jun. 4, 2013

(54) ENABLING SPECTROMETRY ON IR SENSORS USING METAMATERIALS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 470 days.

(21) Appl. No.: 12/509,087

(22) Filed: Jul. 24, 2009

(65) Prior Publication Data

US 2011/0019180 A1  Jan. 27, 2011

(51) Int. Cl.
*G01J 3/00* (2006.01)
(52) U.S. Cl.
USPC .......................................................... 356/51
(58) Field of Classification Search
USPC .................... 356/442, 443, 51, 300–334, 432
See application file for complete search history.

(56) References Cited

U.S. PATENT DOCUMENTS

| | | | |
|---|---|---|---|
| 5,811,815 A * | 9/1998 | Marshall et al. | 250/370.06 |
| 6,580,089 B2 * | 6/2003 | Bandara et al. | 257/14 |
| 6,690,014 B1 * | 2/2004 | Gooch et al. | 250/338.4 |
| 7,402,803 B1 | 7/2008 | Wagner | |
| 7,522,328 B2 | 4/2009 | Wagner | |
| 2004/0021861 A1 * | 2/2004 | Lewis et al. | 356/326 |
| 2008/0088524 A1 * | 4/2008 | Wang et al. | 343/909 |
| 2008/0156991 A1 * | 7/2008 | Hu et al. | 250/341.1 |
| 2008/0165079 A1 * | 7/2008 | Smith et al. | 343/911 R |
| 2010/0141358 A1 | 6/2010 | Akyurtlu et al. | |
| 2011/0176577 A1 * | 7/2011 | Bandara et al. | 374/121 |
| 2012/0057616 A1 * | 3/2012 | Padilla et al. | 374/179 |

FOREIGN PATENT DOCUMENTS

| | | |
|---|---|---|
| WO | 2005094460 A2 | 10/2005 |
| WO | 2007103560 A2 | 9/2007 |

OTHER PUBLICATIONS

Tao et al., A metamaterials absorber for the terahertz regime: Design, fabrication and characterization, Optics Express, vol. 16, No. 10, May 12, 2008, pp. 7181-7188 (Abstract, figures 1-5; whole document text).

Santavicca et al, Terahertz resonances and bolometric response of a single-walled carbon nanotube, 33rd International Conference on Infrared, Millimeter and Terahertz waves, 2008, Sep. 15-19, 2008, IEEE, pp. 1-3, Abstract, fig. 3.

Ginn et al, Altering infrared metamaterial performance through metal resonance damping, Journal of Applied Physics, vol. 105, Apr. 2, 2009.

Wel Wu, et al, Midinfrared Metamaterials Fabricated by Nanoimprint Lithography, Applied Physics Letters 90, 063107, Feb. 6, 2007.

Gun-Young Jung, et al, Circuit Fabrication at 17 nm Half-Pitch by Nanoimprint Lithography, Nano Letters vol. 6, No. 3, pp. 351-354, Feb. 4, 2006.

Uday K Chettiar, et al, Optical Metamagmnetism and Negative-Index Metamaterials, MRS Bulletin, vol. 33, pp. 921-926, Oct. 2008.

N.I. Landy, S. Sajuyigbe, J.J Mock, D.R. Smith, W.J Padilla, Perfecect Metamaterial Absorber, Physical Review Letters 100, 207402, May 23, 2008.

(Continued)

*Primary Examiner* — Tarifur Chowdhury
*Assistant Examiner* — Michael P LaPage
(74) *Attorney, Agent, or Firm* — Foley & Lardner LLP

(57) ABSTRACT

Various implementations of enabling spectroscopy on infrared (IR) sensors are disclosed. The disclosed implementations may include an array of resonant absorbers that may facilitate spectroscopy, such as, for example, IR related spectrometry.

22 Claims, 10 Drawing Sheets

OTHER PUBLICATIONS

Jiaguang Han, Akhlesh Lakhtakia, Cheng-Wei Qiu, Terahertz Metamaterials with Semiconductor Split-Ring Resonators for Magnetostatic Tunability, Optics Express, vol. 16, Issue 19, pp. 14390-14396, Aug. 29, 2008.

P. Eriksson, J.Y. Andersson, G. Stemme, Interferometric, low thermal mass IR absorber for thermal infrared detectors, Physica Scripta, T54 1994, pp. 165-168.

Wikipedia., "Impedance of free space," accessed at http://en.wikipedia.org/wiki/characteristic_impedance_of_vacuum, last modifed on Mar. 1, 2012.

Flusberg, A. et al, "Highly sensitive infrared imager with direct optical readout," Proceedings of SPIE, vol. 6206, pp. 62061E (2006).

International Search Report and Written Opinion for International Application No. PCT/US2010/038186 mailed on Sep. 14, 2010.

* cited by examiner

ENABLING SPECTROMETRY ON IR SENSORS USING METAMATERIALS

BACKGROUND

Infrared (IR) detectors and imagers may employ an IR absorber that converts incoming IR energy into heat within the device so that the IR energy can be detected. IR absorbers may employ uniformly deposited layers having free space impedance equal to half the impedance of free space for effective black-body coupling to aid IR detection. For example, a layer of amorphous silicon may be used to absorb infrared radiation and convert the radiation into heat that may be detected using a thermal detector such as a microbolometer array. Another approach may include using a very thin deposition of platinum (on the order of 35 nm in thickness) as an IR absorbing layer. Yet another approach may include forming stacks of interferometric layers. These approaches may provide for uniform absorption of IR radiation across an IR detector.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
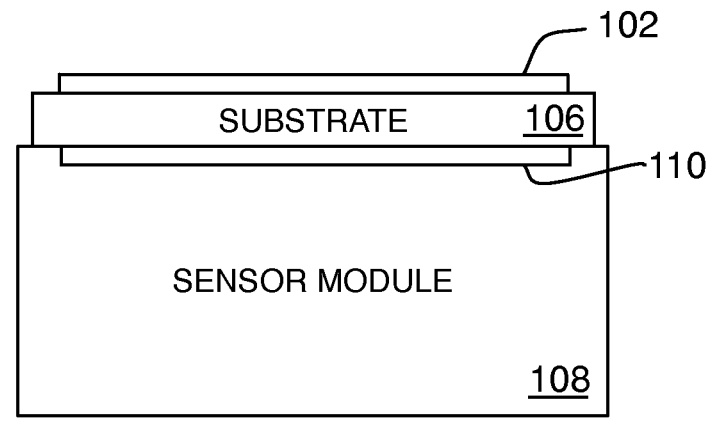
FIG. 1 is a block diagram of an example sensor device incorporating a resonant absorber array.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, and systems related to using arrays of resonant absorbers to facilitate spectrometry, such as infrared (IR) spectrometry, where different array portions may absorb different wavelengths of incident optical radiation to provide selective absorptive response over multiple wavelength ranges.

In accordance with the present disclosure, arrays of resonant absorbers may be formed on a substrate where different portions of the array may include different resonant absorbers capable of absorbing different wavelengths or wavelength ranges of incident radiation. For example, various different resonant absorbers may be employed in different regions of an absorber array to absorb optical radiation spanning various wavelength ranges. For example, different regions of an absorptive array may absorb radiation over different portions of a spectrum of incident radiation spanning wavelengths between approximately 500 nm to approximately 100 μm. Further, in accordance with some implementations, an array of resonant absorbers may be formed on a surface using imprint lithography techniques where the size and shape of the resonant absorbers may be tailored to preferentially absorb certain wavelengths and/or wavelength ranges. Further, in accordance with some implementations, substrates may be patterned with arrays of resonant absorbers and coupled to thermal detection devices, such as, for example, microbolometer arrays, to provide sensor devices. Such devices may be incorporated in detection systems such as spectrometers and may be used to selectively detect particular wavelengths of radiation such as particular wavelengths of IR radiation.

Figure 2:
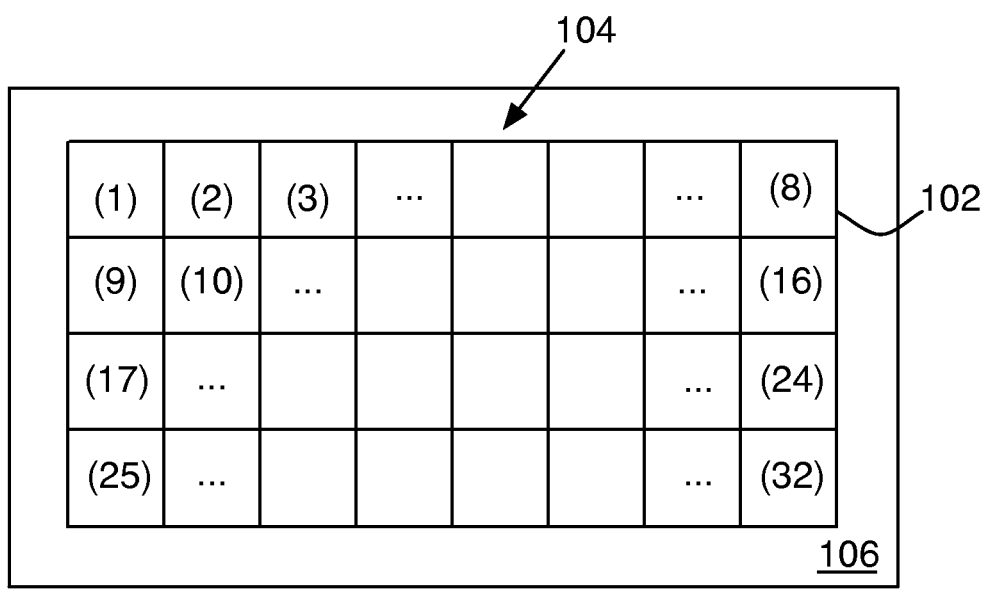
FIG. 2 illustrates an example resonant absorber array of the sensor device of FIG. 1.

FIG. 1 is a block diagram of an example sensor device 100 in accordance with at least some examples of the present disclosure. FIG. 2 is a plan view of portions of device 100. Referring to FIGS. 1 and 2, device 100 includes an array 102 of resonant absorber regions 104(1), 104(2) . . . 104(32) formed on a substrate 106. Each absorber region may include one or more resonant absorbers as will be explained in greater detail below. Device 100 may also include a sensor module 108 including a sensor array 110 located adjacent to substrate 106. Device 100 has been presented herein as an example device for illustrative purposes and claimed subject matter is not limited to the particular items and/or configuration of components illustrated in FIGS. 1 and 2. Thus, for example, the specific numbers, sizes or shapes of resonant absorber regions 104 and/or the size or aspect ratio of array 102 as shown should not be construed to limit claimed subject matter. For example, while thirty-two resonant absorber regions 104 formed in a rectangular array 102 have been depicted in FIG. 2, different numbers of absorber regions may be employed in various configurations rectangular or otherwise. For example, hundreds or thousands of absorber regions may be employed in a device where each absorber region includes one or more resonant absorbers.

Figure 3:
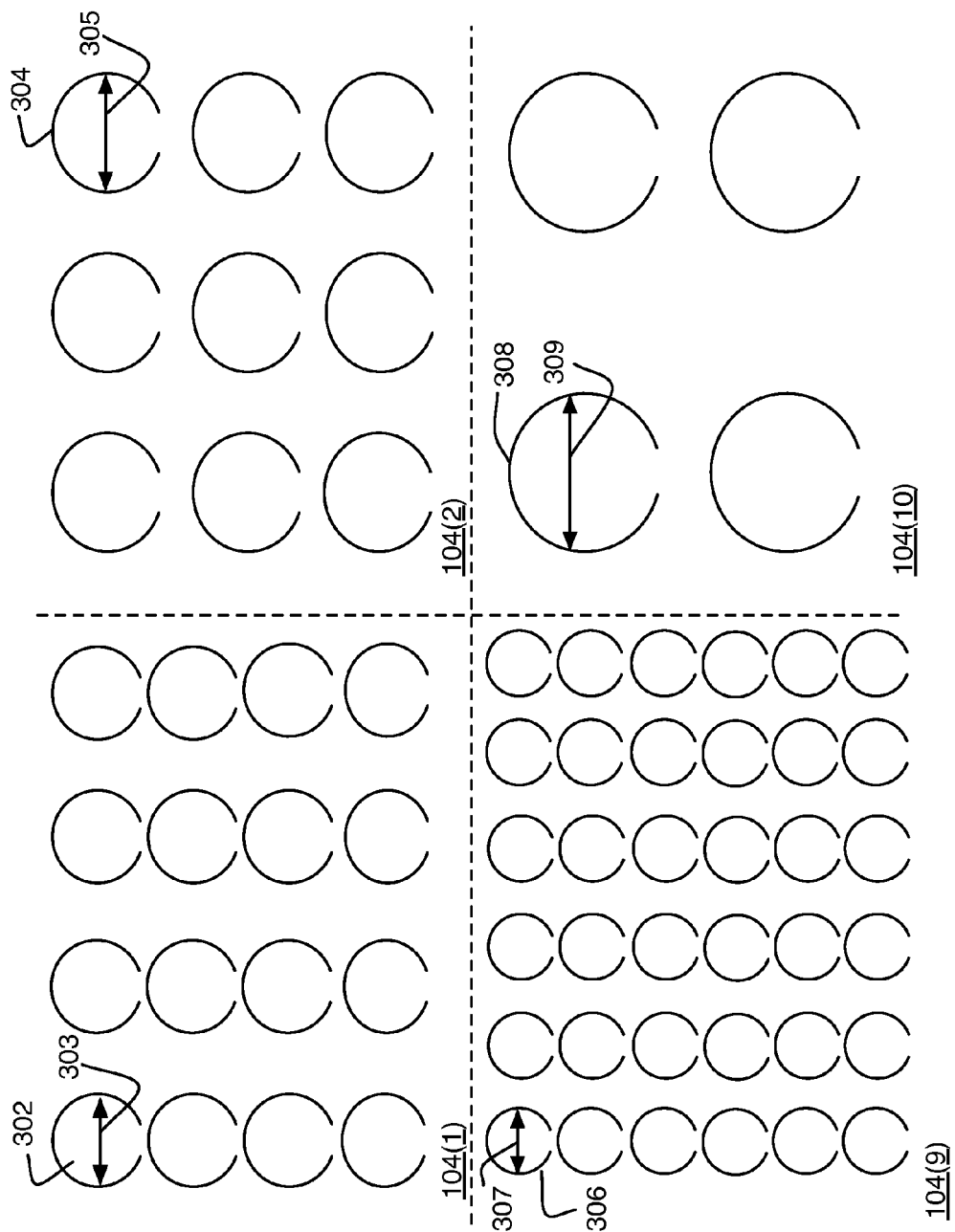
FIG. 3 illustrates a portion of the resonant absorber array of FIG. 2 in greater detail.

FIG. 3 is a plan view illustrating a portion of array 102 in greater detail. As illustrated, region 104(1) may include multiple resonant absorbers 302, region 104(2) may include multiple resonant absorbers 304, region 104(9) may include multiple resonant absorbers 306, and region 104(10) may include multiple resonant absorbers 308. Again, as noted above with respect to FIGS. 1 and 2, the items illustrated in FIG. 3 are provided for explanatory purposes and in the interest of clarity and are not necessarily illustrated to scale nor meant to limit claimed subject matter to particular numbers, sizes, shapes, aspect ratios or orientations of absorbing regions, nor to particular numbers, sizes, shapes or orientations of resonant absorbers included within particular absorbing regions. Thus, for example, while FIG. 3 illustrates four resonant absorbers 308 in region 104(10), in various implementations, an absorptive region may include any number of resonant absorbers ranging, for example, from one resonant absorber to millions of resonant absorbers.

In accordance with the present disclosure, each resonant absorber 302 in region 104(1) may exhibit a different absorptive response than the resonant absorbers 304, 306 and/or 308 of respective regions 104(2), 104(9) and/or 104(10). For example, each resonant absorber 302 may be in the form, as illustrated, of a split-loop shaped resonator created, for example, by depositing curved metal lines on substrate 106. For example, each absorber 302 may be formed with a line width of approximately 50 nm and a diameter 303 of approximately 750 nm. In some implementations, a split-loop shaped resonant absorber may act as an antenna and may absorb radiation having wavelengths on the order of the diameter of the resonant absorber. For example, although claimed subject matter is not limited in this regard, a split-loop shaped resonant absorber having a diameter of approximately 750 nm may be expected to preferentially absorb radiation having wavelengths of about 75 nm to about 7.5 µm.

Similarly, each resonant absorber 304 in region 104(2), having a diameter of 305 of approximately 1,000 nm (or 1 µm), may be expected to preferentially absorb radiation having wavelengths of about 100 nm to about 10 µm. Likewise, each resonant absorber 306 in region 104(9) may be formed with a diameter 307 of approximately 500 nm and may be expected to preferentially absorb radiation having wavelengths of about 50 nm to about 5 µm, and each absorber 308 in region 104(10), having a diameter 309 of approximately 1.25 µm, may be expected to absorb radiation having wavelengths of about 125 nm to about 12.5 µm.

Figure 4:
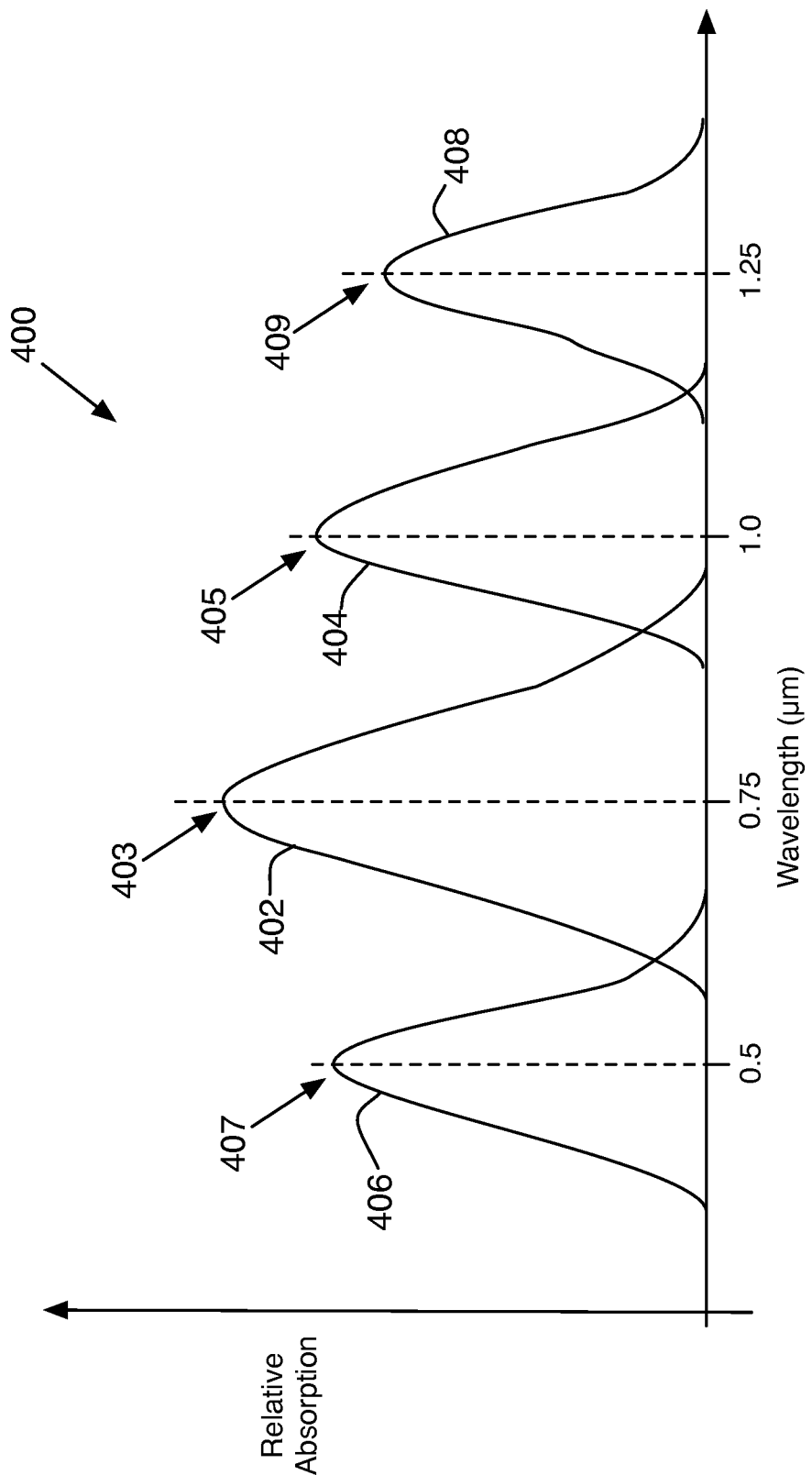
FIG. 4 illustrates hypothetical absorption profiles.

FIG. 4 illustrates hypothetical absorption profiles 400 for regions 104(1), 104(2), 104(9) and 104(10) of array 102. FIG. 4 is provided herein for explanatory purposes and features presented therein are not necessarily illustrated to scale nor meant to limit claimed subject matter to particular examples of absorption profiles, peak absorptive response wavelengths, etc. As described above and illustrated herein, region 104(1) may preferentially absorb radiation with a profile 402 having a peak absorptive response wavelength 403 of approximately 0.75 µm, region 104(2) may preferentially absorb radiation with a profile 404 having a peak absorptive response wavelength 405 of approximately 1.0 µm, region 104(9) may preferentially absorb radiation with a profile 406 having a peak absorptive response wavelength 407 of approximately 0.5 µm, and region 104(10) may preferentially absorb radiation with a profile 408 having a peak absorptive response wavelength 409 of approximately 1.25 µm.

In some implementations, resonant absorbers, such as absorbers 302, 304, 306 and 308 of FIG. 3, may be described as metamaterials. In some implementations, metamaterials may include structures having complex electric permittivity and magnetic permeability that, when impedance-matched to free space, may resonantly absorb over a relatively narrow bandwidth of incident radiation. In some implementations, resonant absorbers, such as absorbers 302, 304, 306 and/or 308, may be formed using lithography techniques although claimed subject matter is not limited in this regard. In some implementations, resonant absorbers may be formed from metal such as gold (Au) or silver (Ag) deposited on a substrate using nanoimprint lithography (NIL) techniques.

In various implementations, the absorptive response of a region may be selected by specifying the structure and/or size of the resonant absorber(s) within that region. Thus, as described in the example implementation of FIG. 3, by depositing split-loop shaped resonant absorbers having different diameters, different absorbing regions may be designed to have different predetermined absorptive responses including different peak absorptive response wavelengths. Hence, while FIG. 3 illustrates resonant absorbers having a split-loop shape, claimed subject matter is not limited in this regard and resonant absorbers having various two-dimensional shapes and having various dimensions may be employed.

Figure 5:
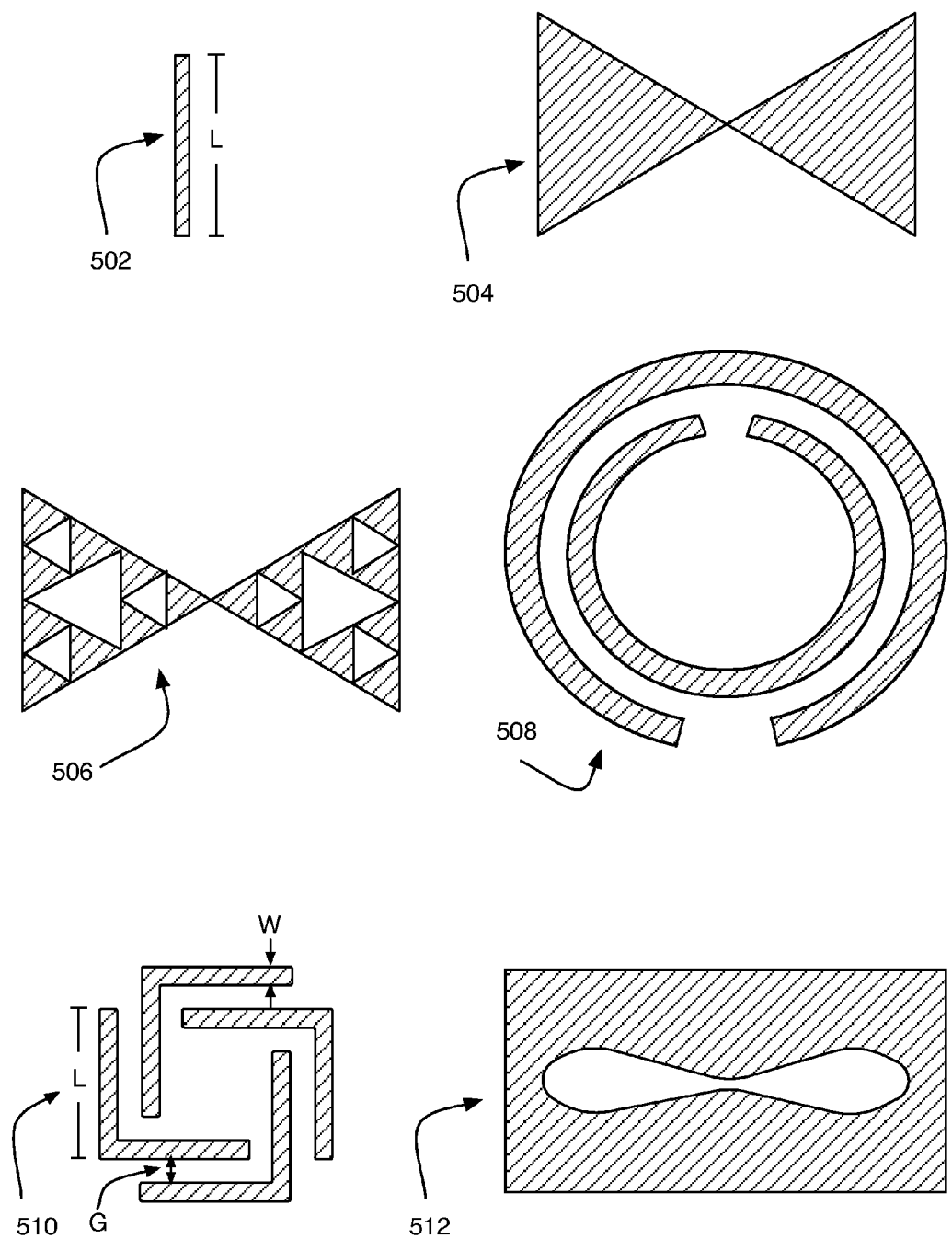
FIG. 5 illustrates example resonant absorber structures.

FIG. 5 illustrates additional example resonant absorber structures that may be employed in various implementations of the present disclosure. For example, resonant absorbers may also be created in the form of structures having dipole 502, bowtie 504, fractal bowtie 506, split-ring 508, L-shaped 510, or ultra-wideband 512 shapes to name just some of a wide variety of possible resonant structures. Thus, for example, in various implementations absorptive regions 104 (1), 104(2), 104(9) and/or 104(10) may employ differing sized dipole shaped resonant structures. For example, in some implementations, a resonant absorber having the form of dipole 502 may be expected to preferentially absorb radiation with wavelengths on the order of approximately twice the length of the dipole resonant absorber. Hence, for example, providing dipole resonant absorbers having lengths L of approximately 450 nm in one absorptive region may be expected to result in the preferential absorption of radiation having peak absorptive response wavelengths of about 875 nm to about 925 nm, while employing dipole resonant absorbers having lengths of approximately 375 nm in a different absorptive region may be expected to result in the preferential absorption of radiation having a peak absorptive response wavelength of about 725 nm to about 775 nm.

Further, in some implementations, differently shaped resonant absorber structures may be employed in different areas of a substrate. For example, an absorptive region may employ a split-loop shaped resonant absorber while another absorptive region on the same substrate may employ a dipole shaped resonant absorber while yet another absorptive region on the same substrate may employ a bowtie shaped resonant absorber, etc.

In various implementations, as described above in the context of resonant absorbers having split-loop and dipole structures, the wavelengths preferentially absorbed may depend on several specific structural dimensions of the resonant absorber. For example, when employing an L-shaped resonator 510, the absorptive response of the resonant absorber may depend on the dimensions W, L, and G shown in FIG. 5. For example, an L-shaped resonant absorber 510 having approximate values of 90 nm, 550 nm and 45 nm for dimensions W, L, and G, respectively, may be expected to preferentially absorb a narrow-band range of wavelengths including a peak absorptive response at wavelengths of about 4 μm to about 5 μm. By selecting different values for dimensions W, L, and G, an L-shaped resonant absorber 510 may be configured to provide a specific absorptive response having peak absorptive response wavelengths at wavelengths other than about 4 μm to about 5 μm.

Figure 6:
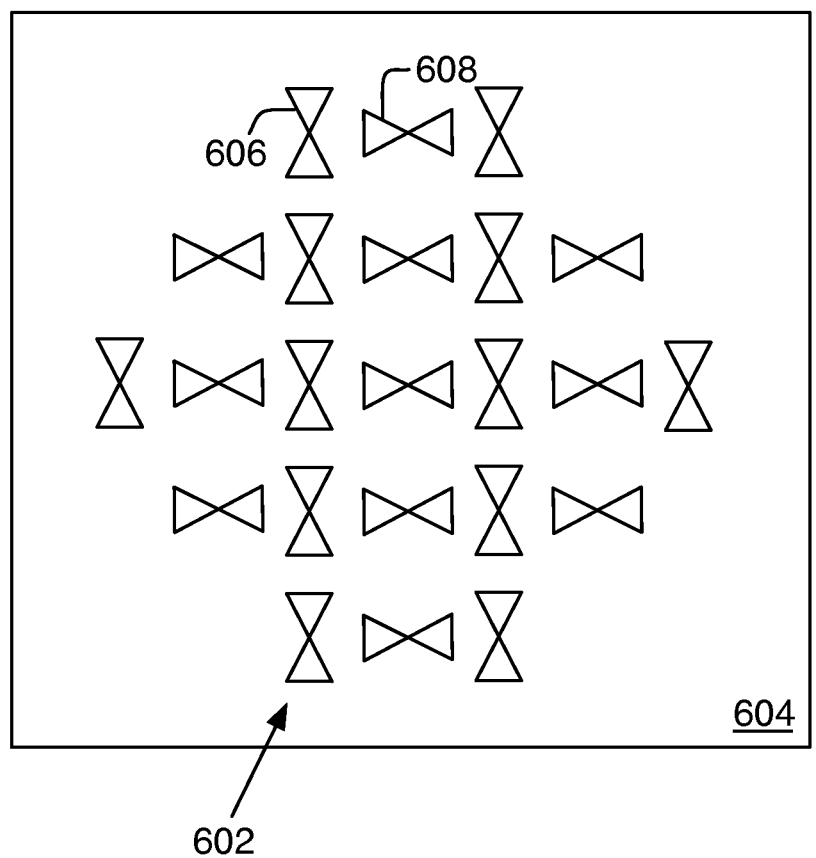
FIG. 6 illustrates an example resonant absorber array.

While various implementations, such as implementations of array 102 described above, may employ arrays of resonant absorbers where each resonant absorbers may have a similar orientation, claimed subject matter is not limited in this regard and, thus, in various implementations, different resonant absorbers on a substrate may have different orientations. For example, FIG. 6 illustrates a plan view of an example array 602 of bowtie shaped resonant absorbers formed on a substrate 604 where adjacent resonant absorbers, for example, resonant absorbers 606 and 608, have different orientations with respect to the surface of substrate 604. In some implementations, substrate 604 bearing array 602 may be utilized in place of substrate 106 and array 102 of FIG. 1. In general, many different orientations of resonant absorbers and/or combinations of orientations of resonant absorbers may be employed in accordance with claimed subject matter.

Figure 7:
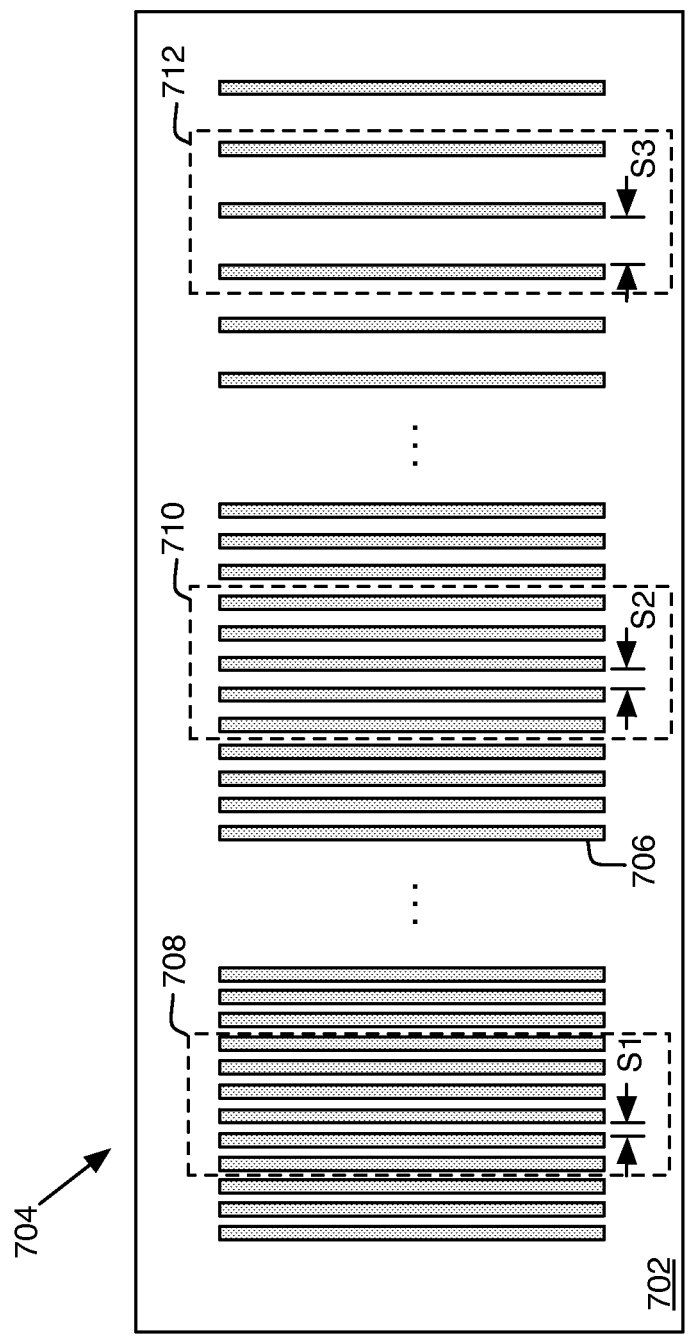
FIG. 7 illustrates an example resonant absorber array.

In some implementations, a substrate may be provided with a gradient array of resonant absorbers. FIG. 7 illustrates a plan view of an example substrate 702 patterned with a gradient array 704 of resonant absorbers 706 where the absorptive response of resonant absorbers 706 may depend on the spacing between adjacent absorbers. In some implementations, substrate 702 bearing array 704 may be utilized in place of substrate 106 and array 102 of FIG. 1. Array 704 may include resonant absorbers 706 in the form of discrete conductive lines patterned on substrate 702, using, for example NIL techniques, where the spacing between resonant absorbers 706 varies across substrate 702.

Again, as noted previously with respect to FIGS. 1-6, the items illustrated in FIG. 7 are provided herein for explanatory purposes and, in the interest of clarity, are not necessarily illustrated to scale. Thus, for example, FIG. 7 may exaggerate the relative size of absorbers 706 with respect to substrate 702. For example, absorbers 706 may have widths on the order of tens or hundreds of microns while substrate 702 may have dimensions on the order of millimeters or centimeters. Further, the numbers, shapes, relative dimensions and/or orientations of the items illustrated in FIG. 7 should not be construed to limit claimed subject matter. Thus, for example, while a relatively small number of absorbers 706 are illustrated in FIG. 7, in various implementations much larger numbers of absorbers 706 (e.g., thousands or millions) may be employed on substrate 702.

As noted above, by varying the spacing between resonant absorbers 706 the absorptive response of array 704 may vary with location across substrate 702. For example, by fabricating resonant absorbers 706 in a region 708 having a different spacing S1 than resonant absorbers 706 in regions 710 and 712, having spacing values S2 and S3 respectively, the absorptive response of regions 708, 710 and/or 712 may be different. In general, in some implementations, a difference in spacing values of 5% between lines in different portions of an array may be expected to result in substantially different absorptive responses for those portions. Further, in some implementations, the spacing between resonant absorbers 706 may vary discontinuously across array 704, while, in other implementations the spacing between resonant absorbers 706 may vary continuously across array 704 or in any combination of continuous and discontinuous variation.

Returning to device 100 of FIG. 1, in various implementations, sensing elements in array 110 of sensor module 108 may detect thermal energy generated by the absorption of incident radiation by one or more resonant absorbers of array 102. In various implementations, sensor module 108 may employ various mechanisms for detecting thermal energy produced by resonant absorbers and claimed subject matter is not limited to any particular mechanism employed.

Further, in various implementations, substrate 106 may be transparent to incident radiation, such as IR radiation, and sensing elements in array 110 of sensor module 108 may detect incident radiation that is not absorbed the resonant absorbers of array 102. For example, in some implementations, substrate 106 may be formed from an IR transparent material such as Silicon and array 110 may be an IR sensing array such as a Mercury Cadmium Telluride (MCT) sensing array. In various implementations, sensor module 108 may employ various mechanisms for detecting incident radiation not absorbed by resonant absorbers and claimed subject matter is not limited to any particular mechanism employed.

Figure 8:
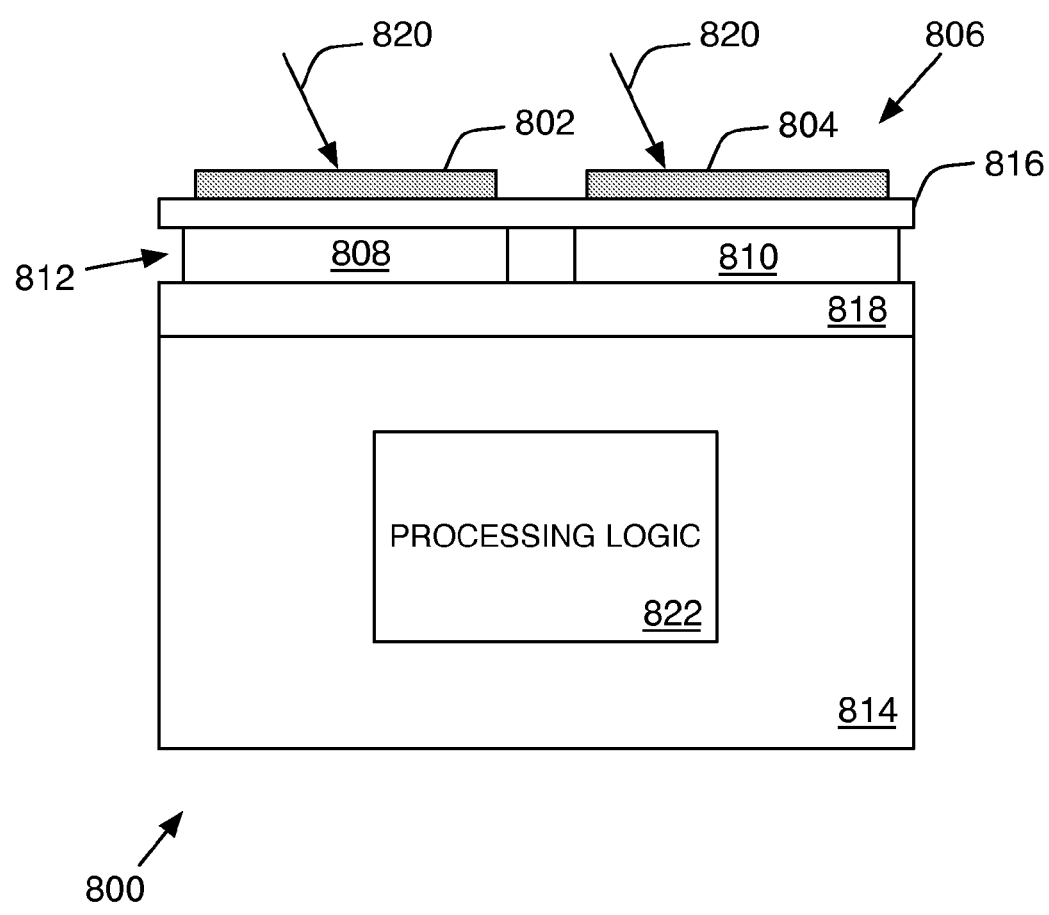
FIG. 8 is a block diagram of an example sensor device incorporating a resonant absorber array.

FIG. 8 is a block diagram illustrating components of a sensor device 800 employing a microbolometer array in accordance with various implementations. Specifically, as illustrated, two absorptive regions 802 and 804 of a resonant absorber array 806 may be thermally coupled to respective microbolometer sensing elements 808 and 810 of a sensor array 812 that may be, in turn, coupled to a sensor module 814. Absorber array 806 and sensor array 812 may be formed on respective substrates 816 and 818. Regions 802 and 804 may exhibit different absorptive responses and may employ any of wide variety of resonant absorber structures (not shown) such as split-loop, dipole, bowtie shaped etc. Further, each of regions 802 and 804 may include one or more resonant absorbers.

While FIG. 8 illustrates a one-to-one correspondence of absorptive regions to sensor elements, claimed subject matter is not limited in this regard and, thus, in various implementations, an absorptive region may be thermally coupled to one or more sensor elements. Further, while FIG. 8 illustrates two regions of array 806 and two elements of array 812, arrays 806 and 812 may include many more regions and elements respectively, and, thus, FIG. 8 may correspondingly illustrate only portions of substrates 816 and 818 and module 814.

Absorptive regions 802 and 804 may be thermally coupled to the sensing elements to allow energy in the form of a thermal impulse to be conveyed from region 802 to sensing element 808 but not to sensing element 810, while a thermal energy impulse may be conveyed from region 804 to sensing element 810 but not to sensing element 808. While not shown in FIG. 8, thermal isolation structures may be formed on and/or within substrate 816 to enhance thermal isolation between regions 802 and 804. Similarly, while also not shown in FIG. 8, thermal isolation structures may be formed on and/or within substrate 818 to enhance thermal isolation between sensor elements 808 and 810. In some implementations, device 800 may include other additional features (e.g., passivation layers, circuitry, etc.) that have not been illustrated in FIG. 8 in the interest of clarity.

In some implementations, sensing elements 808 and 810 may include amorphous silicon configured to exhibit different resistance values as a function of temperature. For example, depending upon an amount of energy conveyed in a thermal impulse from region 802 to element 808 in response to region 802 absorbing at least a portion of incident optical radiation 820, a resistance value associated with element 808 may change. In some implementations, changes in the resistance value of element 808 may facilitate spectrometry by permitting the assessment of an amount of a substance such as an atom or molecule associated with incident optical radiation 820. For example, an intensity value for a peak absorptive response wavelength of incident radiation 820 derived from the absorptive response of region 802 as sensed by element 808 may be correlated to an amount of carbon dioxide contained in a region of space traversed by incident radiation 820 prior to arrival at device 800.

Thus, by correlating a predetermined absorptive response of region 802 with respect to radiation 820, a resistance value associated with element 808 may be used to determine an absorbance for a specific wavelength range. Further, a comparative absorptive response may be determined by evaluating the absorptive response of region 802 in comparison to the absorptive response of region 804, where region 804 exhibits a different absorptive response than region 802. In some implementations, by determining comparative absorptive response between various absorptive regions of an absorber array, incident radiation may be spectroscopically analyzed.

Device 800 may also include processing logic 822 coupled to elements 808-810 of array 812 via structures (such as signal traces, circuitry, etc.) not illustrated in FIG. 8 in the interests of clarity. In some implementations, processing logic 822 may perform pre-processing on signals received from elements 808 and/or 810. For example, logic 822 may receive analog voltage and/or current signals from elements 808 and/or 810 and may convert those signals into digital form. In various implementations, processing logic 822 may also be configured to undertake generating comparative absorptive responses, etc.

In various other implementations, device 800 may employ an IR sensor array 812, such as an MCT array, and substrate 816 may be formed of IR transparent material such as Silicon. In such implementations, incident radiation 820 not absorbed by region 802 and/or region 804 may pass through substrate 816 and be detected by elements 808 and 810. For example, region 802 may absorb particular wavelengths of incident radiation 820 and not allow those wavelengths to reach element 808 while region 804 may not absorb those particular wavelengths and may thereby permit them to pass through substrate 816 to reach element 810. Processing logic 822 may then use the absence of signal from element 808 and the presence of signal from element 810 to undertake spectroscopic analysis of incident radiation 820.

Figure 9:
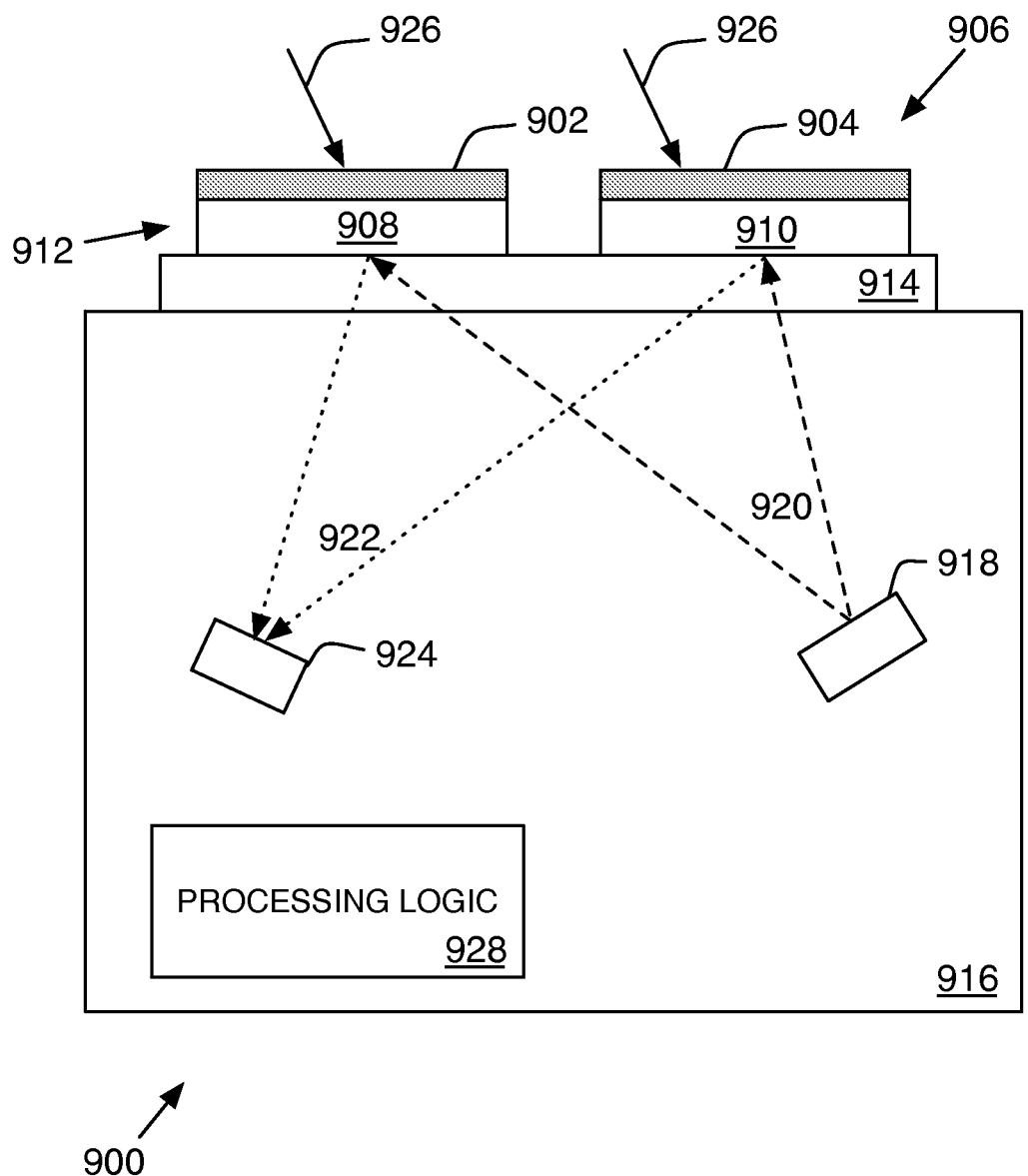
FIG. 9 is a block diagram of an example sensor device incorporating a resonant absorber array.

FIG. 9 is a block diagram illustrating components of a sensor device 900 employing a thermal light valve (TLV) array in accordance with various implementations of the present disclosure. Specifically, as illustrated, two absorptive regions 902 and 904 of a resonant absorber array 906 may be thermally coupled to respective thermally tunable elements 908 and/or 910 of a TLV array 912 formed on a substrate 914 that may be, in turn, be coupled to a sensor module 916. In some implementations, elements 908 and/or 910 may be formed as thin film interference filters although claimed subject matter is not limited in this regard.

Regions 902 and 904 may exhibit different absorptive responses and may employ any of wide variety of resonant absorber structures (not shown) such as split-loop, dipole, bowtie shaped etc. Further, each of regions 902 and 904 may include one or more resonant absorbers. Moreover, while FIG. 9 illustrates a one-to-one correspondence of absorptive regions to thermally tunable elements, claimed subject matter is not limited in this regard and, thus, in various implementations, an absorptive region may be thermally coupled to one or more thermally tunable elements. Further, while FIG. 9 illustrates two regions of array 906 and two elements of array 912, arrays 906 and/or 912 may include many more regions and elements respectively, and, thus, FIG. 9 may illustrate only portions of substrate 914 and module 916.

Absorptive regions 902 and 904 may be coupled to respective elements 908 and 910 to allow energy in the form of a thermal impulse to be conveyed from region 902 to element 908 but not to element 910, while a separate thermal impulse may be conveyed from region 904 to element 910 but not to element 908. While not shown in FIG. 9, thermal isolation structures may be formed on and/or within substrate 914 to enhance thermal isolation between elements 908 and 910. In some implementations, device 900 may also include additional features (e.g., passivation layers, circuitry, etc.) that have not been illustrated in FIG. 9 in the interest of clarity.

Device 900 may also include a light source module 918 (such as a diode laser) that may be configured to illuminate elements 908 and 910 with incident carrier radiation 920. In response, elements 908 and 910 may be arranged to redirect at least some of that radiation in the form of reflected radiation 922 to a detection module 924. In some implementations, respective optical responses of elements 908 and 910 may change as a function of temperature resulting in elements 908 and 910 providing different amounts of reflected radiation 922 when elements 908 and 910 receive different amounts of thermal energy from respective regions 902 and 904. Thus, for example, depending upon an amount of thermal energy conveyed from region 902 to element 908 in response to region 902 absorbing at least a portion of incident optical radiation 926, an amount of reflected radiation 922 associated with element 908 may change.

Thus, by correlating a predetermined absorptive response of region 902 (e.g., characterized by a wavelength range having a peak absorptive response wavelength) with respect to radiation 926, a reflectance value associated with element 908 may be used to determine an absorbance value for a specific wavelength range. Further, a comparative absorptive response may be determined by evaluating the absorptive response of region 902 in comparison to the absorptive response of region 904, where region 904 exhibits a different predetermined absorptive response than region 902. In some implementations, by determining comparative absorptive response between various absorptive regions of an absorber array, incident radiation may be spectroscopically analyzed.

Device 900 may also include processing logic 928 coupled to detection module 924 via structures (such as signal traces, circuitry, etc.) not illustrated in FIG. 9 in the interests of clarity. In some implementations, processing logic 928 may perform pre-processing on signals derived from reflected radiation 922 received from elements 908 and 910. For example, logic 928 may adapted to receive corresponding analog voltage and/or current signals from module 924 and may be configured to convert those signals into digital form.

In various implementations, processing logic 928 may also be configured to undertake generating comparative absorptive responses, etc. In some implementations, device 900 may include additional elements such as optical components that have been omitted from FIG. 9 in the interest of clarity.

It may be appreciated that devices 800 and 900 represent two examples of many possible implementations employing resonant absorber arrays in accordance with claimed subject matter and that, as a result, claimed subject matter is not limited to the example implementations presented herein.

Figure 10:
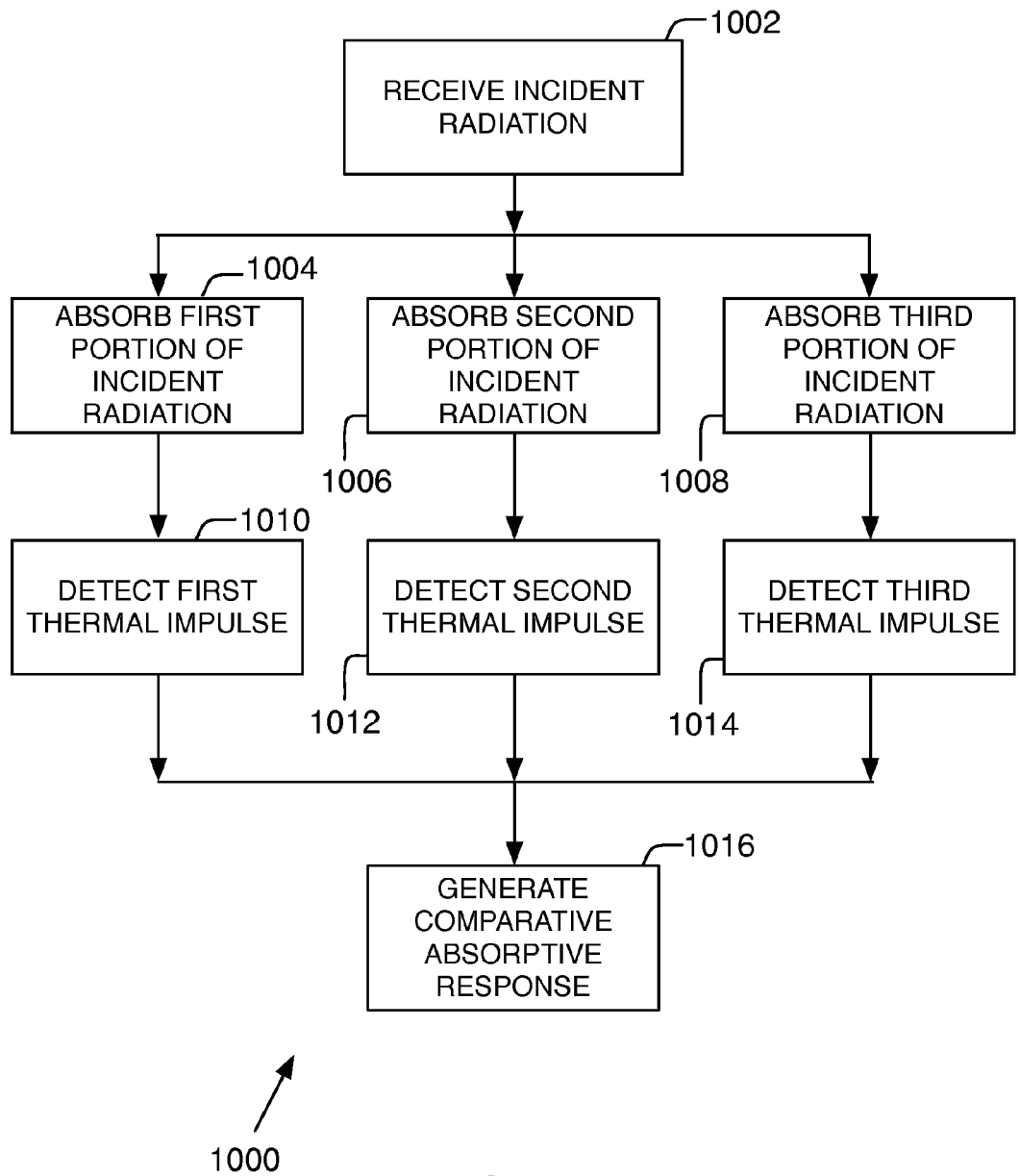
FIG. 10 is a flow chart illustrating an example process for enabling spectroscopy on an IR sensor.

FIG. 10 is a flow chart illustrating an example process 1000 for spectroscopically analyzing incident radiation in accordance with the present disclosure. In some implementations, process 1000 may be implemented employing any of the devices, components and/or items described above with respect to FIGS. 1-9. Those skilled in the art in light of the present disclosure will recognize that numerous alternatives to the functional blocks shown in FIG. 10 may be practiced in accordance with claimed subject matter. Process 1000 may include one or functional operations, actions or process steps or features as illustrated by one or more of blocks 1002, 1004, 1006, 1008, 1010, 1012, 1014, and/or 1016.

Process 1000 may include receiving incident radiation at the surface of a device [block 1002] where the surface of the device includes first, second and third absorptive regions, each absorptive region having one or more resonant absorbers. Process 1000 may then continue with the absorption of a first portion of the incident radiation by the first absorptive region to generate a first thermal impulse [block 1004], absorption of a second portion of the incident radiation by the second absorptive region to generate a second thermal impulse [block 1006], and absorption of a third portion of the incident radiation by the third absorptive region to generate a third thermal impulse [block 1008], where the first, second and third portions of the incident radiation correspond to different wavelength ranges of the incident radiation received in block 1002.

Process 1000 may then continue with detection of the first thermal impulse [block 1010], detection of the second thermal impulse [block 1012], and detection of the third thermal impulse [block 1014]. Process 1000 may then conclude with the generation of a comparative absorptive response [1016]. For example, in some implementations, referring to FIGS. 1-3 and 8, blocks 1004, 1006 and 1008 may correspond to respective absorptive regions 104(1), 104(2) and 104(9) absorbing incident radiation over different wavelength ranges to generate corresponding thermal impulses, respective sensor elements associated with regions 104(1), 104(2) and 104(9) detecting the respective thermal impulses regions in blocks 1010, 1012 and 1014, and logic, including, for example, processing logic 822, processing and comparing signals derived from the thermal impulses to generate a comparative absorptive response in block 1016 that may be used to facilitate spectral analysis of the incident radiation. For example, spectral analysis may include comparing the relative absorptive responses of regions 104(1), 104(2) and 104(9) as indicated by the thermal impulses detected in blocks 1010, 1012 and 1014 to determine the relative intensity of the incident radiation as a function of wavelength.

Figure 11:
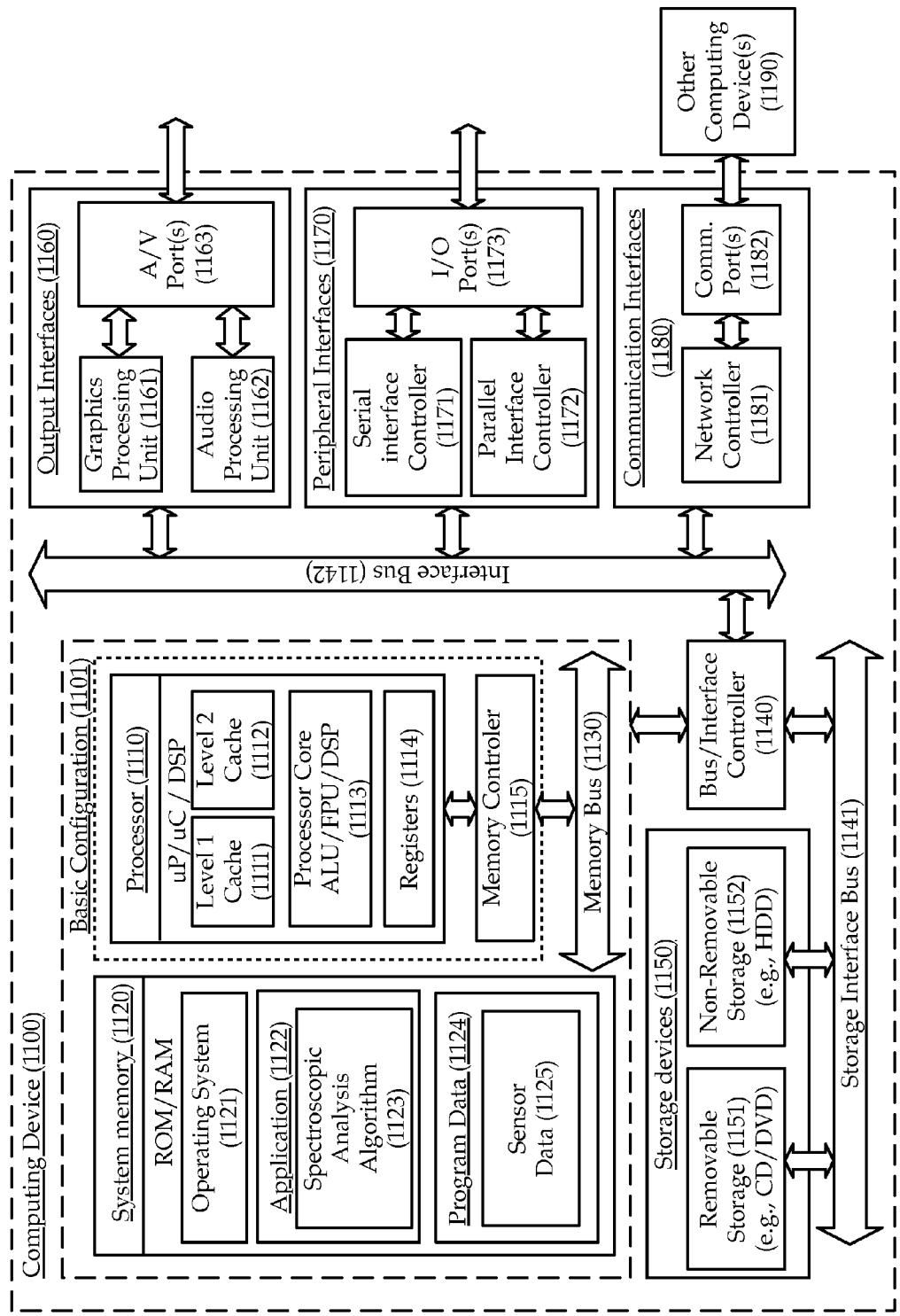
FIG. 11 is a block diagram illustrating an example computing device, all arranged in accordance with the present disclosure.
Figure 11:
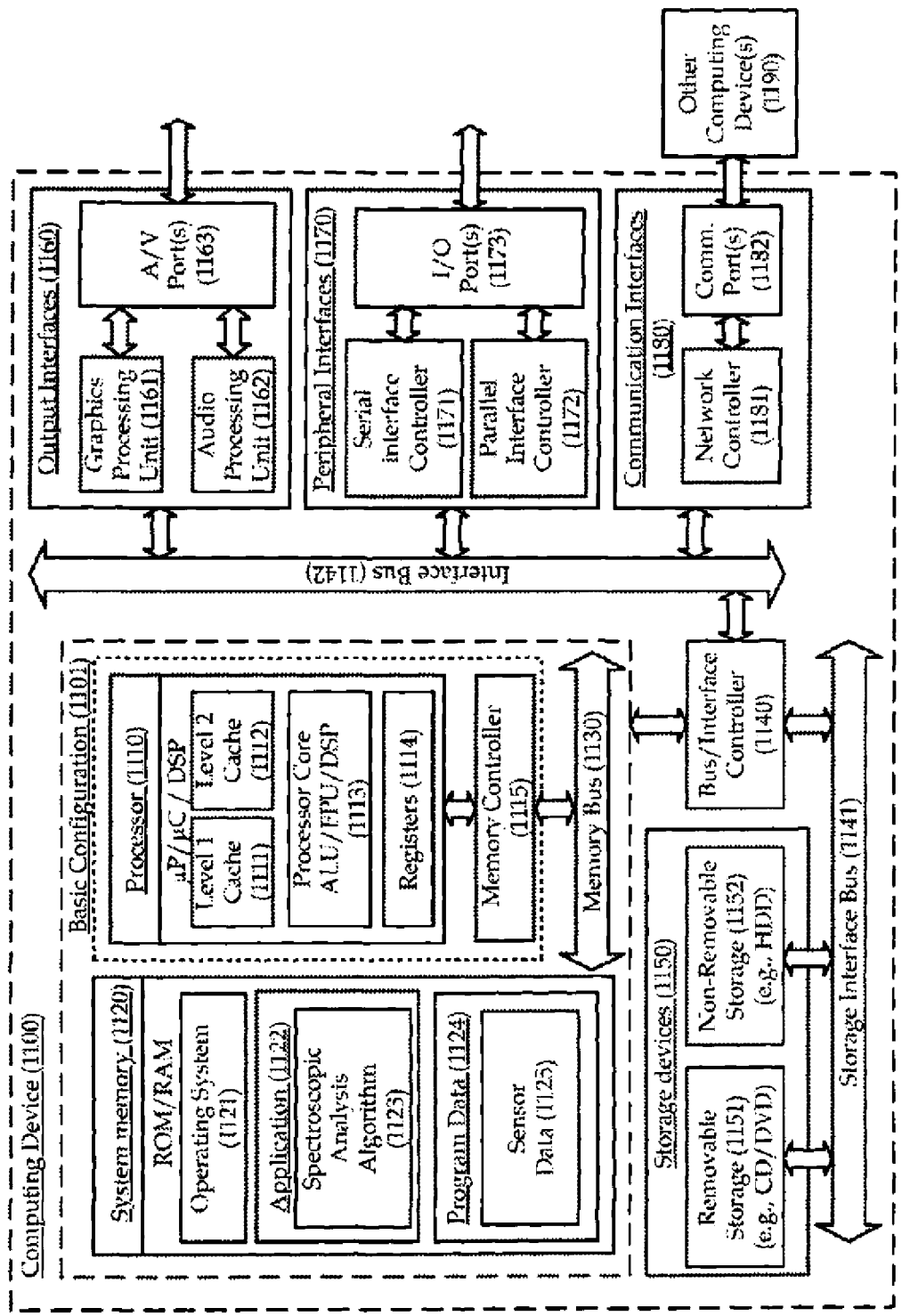

FIG. 11 is a block diagram illustrating an example computing device 1100 that may be arranged for enabling spectrometry on IR sensors in accordance at least some examples of the present disclosure. In a very basic configuration 1101, computing device 1100 may include one or more processors 1110 and system memory 1120. A memory bus 1130 may be used for communicating between the processor 1110 and the system memory 1120.

Depending on the desired configuration, processor 1110 may be of any type including but not limited to a microprocessor ($\mu$P), a microcontroller ($\mu$C), a digital signal processor (DSP), or any combination thereof. Processor 1110 may include one or more levels of caching, such as a level one cache 1111 and a level two cache 1112, a processor core 1113, and registers 1114. The processor core 1113 may include an arithmetic logic unit (ALU), a floating point unit (FPU), a digital signal processing core (DSP Core), or any combination thereof. A memory controller 1115 may also be used with the processor 1110, or in some implementations the memory controller 1115 may be an internal part of the processor 1110.

Depending on the desired configuration, the system memory 1120 may be of any type including but not limited to volatile memory (such as RAM), non-volatile memory (such as ROM, flash memory, etc.) or any combination thereof. System memory 1120 may include one or more of an operating system 1121, one or more applications 1122, and program data 1124. Application 1122 may include a spectroscopic analysis algorithm 1123 that may be arranged to perform the functions as described herein including the functional blocks described with respect to the process of FIG. 10. Program Data 1124 may include sensor data 1125, for example, sensor resistance values, optical intensity values, etc, which may be useful for implementing spectroscopic analysis algorithm 1123. In some example embodiments, application 1122 may be arranged to operate with program data 1124 on an operating system 1121 such that implementations of enabling spectrometry on IR sensors may be provided as described herein. This described basic configuration is illustrated in FIG. 11 by those components within dashed line 1101.

Computing device 1100 may have additional features or functionality, and additional interfaces to facilitate communications between the basic configuration 1101 and any required devices and interfaces. For example, a bus/interface controller 1140 may be used to facilitate communications between the basic configuration 1101 and one or more data storage devices 1150 via a storage interface bus 1141. The data storage devices 1150 may be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of device 1100.

Computing device 1100 may also include an interface bus 1142 for facilitating communication from various interface devices (e.g., output interfaces, peripheral interfaces, and communication interfaces) to the basic configuration 1101 via the bus/interface controller 1140. Example output interfaces 1160 include a graphics processing unit 1161 and an audio processing unit 1162, which may be configured to communicate to various external devices such as a display or speakers via one or more A/V ports 1163. Example peripheral interfaces 1160 include a serial interface controller 1171 or a parallel interface controller 1172, which may be configured to communicate with external devices such as input devices (e.g., keyboard, mouse, pen, voice input device, touch input device, etc.) or other peripheral devices (e.g., printer, scanner, etc.) via one or more I/O ports 1173. An example communication interface 1180 includes a network controller 1181, which may be arranged to facilitate communications with one or more other computing devices 1190 over a network communication via one or more communication ports 1182. A communication connection is one example of a communication media. Communication media may be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 1100 may also be implemented as a personal computer including both laptop computer and non-laptop computer configurations.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. An apparatus for spectroscopically analyzing radiation, comprising:
    a plurality of resonant absorbers disposed on a substrate; and
    a plurality of sensing elements adjacent to the plurality of resonant absorbers,
    wherein the plurality of resonant absorbers comprise metamaterials,
    wherein the plurality of resonant absorbers comprise a plurality of absorptive regions including a first absorptive region and a second absorptive region, the first absorptive region including a plurality of first resonant absorbers of the plurality of resonant absorbers, the plurality of first resonant absorbers each having substantially a first size and the first absorptive region having a first absorptive response including a first peak absorptive response at a first wavelength, and the second absorptive region including a plurality of second resonant absorbers of the plurality of resonant absorbers, the plurality of second resonant absorbers each having substantially a second size different than the first size, and the second absorptive region having a second absorptive response including a second peak absorptive response at a second wavelength different than the first wavelength, wherein the first wavelength substantially corresponds to a wavelength of either visible or infrared radiation and the second wavelength substantially corresponds to a wavelength of either visible or infrared radiation, and wherein the plurality of sensing elements comprise a first sensing element and a second sensing element, the first sensing element being thermally coupled to substantially only the first absorptive region, and the second sensing element being thermally coupled to substantially only the second absorptive region.

2. The apparatus of claim 1, wherein the plurality of absorptive regions further include a third absorptive region including a plurality of third resonant absorbers of the plurality of resonant absorbers, the plurality of third resonant absorbers each having substantially a third size different than the first size and the second size, and the third absorptive region having a third absorptive response including a third peak absorptive response at a third wavelength different than both the second wavelength and the first wavelength, wherein the third wavelength substantially corresponds to a wavelength of either visible or infrared radiation and wherein the plurality of sensing elements further comprises a third sensing element thermally coupled to substantially only the third absorptive region.

3. The apparatus of claim 1, wherein the plurality of resonant absorbers comprise discrete structures having one or more of a dipole, split loop, split ring, L-shape, bowtie, and/or fractal bowtie shape.

4. The apparatus of claim 1, wherein the plurality resonant absorbers comprise discrete structures disposed on the substrate using nanoimprint lithography.

5. The apparatus of claim 1, wherein the plurality of sensing elements comprise at least one of a thermal light valve array or a microbolometer array.

6. The apparatus of claim 1, wherein the plurality of resonant absorbers comprise a plurality of conductive lines, the plurality of conductive lines having spacing between adjacent ones of the plurality of conductive lines, and wherein spacing between adjacent ones of the plurality of conductive lines of the first absorptive region comprise larger values than spacing between adjacent ones of the plurality of conductive lines of the second absorptive region.

7. A method for spectroscopically analyzing radiation, the method comprising:
receiving incident radiation at a surface of a device, the device including a plurality of resonant absorbers disposed on a substrate, the plurality of resonant absorbers including a first plurality of resonant absorbers each of substantially a first size disposed in a first absorptive region of the device having a first absorptive response including a first peak absorptive response at a first wavelength, and a second plurality of resonant absorbers each of substantially a second size different than the first size disposed in a second absorptive region of the device having a second absorptive response including a second peak absorptive response at a second wavelength different than the first wavelength;
absorbing a first portion of the incident radiation at the first absorptive region to generate a first thermal impulse;
absorbing a second portion of the incident radiation at the second absorptive region to generate a second thermal impulse;
detecting the first thermal impulse using a first element of a sensor array; and
detecting the second thermal impulse using a second element of the sensor array,
wherein the plurality of resonant absorbers comprise metamaterials,
wherein the first portion of the incident radiation substantially corresponds to either visible or infrared radiation, and
wherein the second portion of the incident radiation substantially corresponds to either visible or infrared radiation.

8. The method of claim 7, wherein the plurality of resonant absorbers further include a third plurality of resonant absorbers each substantially of a third size different than the first size and the second size disposed in a third absorptive region of the device, the method further comprising:
absorbing a third portion of the incident radiation at the third absorptive region to generate a third thermal impulse; and
detecting the third thermal impulse using a third element of the sensor array,
wherein the third portion of the radiation comprises a different wavelength range of the radiation than the wavelength ranges of either of the first or second portions of the radiation, and
wherein the third portion of the incident radiation substantially corresponds to either visible or infrared radiation.

9. The method of claim 7, wherein the plurality of resonant absorbers comprise discrete structures having one or more of a dipole, split loop, split ring, L-shape, bowtie, and/or fractal bowtie shape.

10. The method of claim 7, wherein the plurality of resonant absorbers comprise discrete structures disposed on the substrate using nanoimprint lithography.

11. The method of claim 7, wherein the plurality of resonant absorbers comprise a plurality of conductive lines, the plurality of conductive lines having spacing between adjacent ones of the plurality of conductive lines, and wherein spacing between adjacent ones of the plurality of conductive lines of the first absorptive region comprise larger values than spacing between adjacent ones of the plurality of conductive lines of the second absorptive region.

12. The method of claim 7, further comprising:
generating a comparative absorptive response in response to detecting the first and second thermal impulses.

13. A system for spectroscopically analyzing radiation, comprising:
a plurality of resonant absorbers disposed on a substrate;
a plurality of sensing elements adjacent to the plurality of resonant absorbers; and
processing logic coupled to the plurality of sensing elements,
wherein the plurality of resonant absorbers comprise metamaterials,
wherein the plurality of resonant absorbers comprise a plurality of absorptive regions including a first absorptive region and a second absorptive region, the first absorptive region including a plurality of first resonant absorbers of the plurality of resonant absorbers, the plurality of first resonant absorbers each having substantially a first size and the first absorptive region having a first absorptive response including a first peak absorptive response at a first wavelength, and the second absorptive region including a plurality of second resonant absorbers of the plurality of resonant absorbers, the plurality of second resonant absorbers each having substantially a second size different than the first size, and the second absorptive region having a second absorptive response including a second peak absorptive response at a second wavelength different than the first wavelength, wherein the first wavelength substantially corresponds to a wavelength of either visible or infrared radiation and the second wavelength substantially corresponds to a wavelength of either visible or infrared radiation, and wherein the plurality of sensing elements comprise at least a first sensing element thermally coupled to substantially only the first absorptive region and a second sensing element thermally coupled to substantially only the second absorptive region.

14. The system of claim 13, wherein the plurality of resonant absorbers comprise discrete structures having one or more of a dipole, split loop, split ring, L-shape, bowtie, and/or fractal bowtie shape.

15. The system of claim 13, wherein the plurality of resonant absorbers comprise a plurality of conductive lines, the plurality of conductive lines having spacing between adjacent ones of the plurality of conductive lines, and wherein spacing between adjacent ones of the plurality of conductive lines of the first absorptive region comprise larger values than spacing between adjacent ones of the plurality of conductive lines of the second absorptive region.

16. An apparatus for spectroscopically analyzing radiation, comprising:
a plurality of resonant absorbers disposed on a substrate; and
a plurality of sensing elements adjacent to the plurality of resonant absorbers,
wherein the plurality of resonant absorbers comprise metamaterials,
wherein the plurality of resonant absorbers comprise a plurality of absorptive regions including a first absorptive region and a second absorptive region, the first absorptive region including a plurality of first resonant absorbers of the plurality of resonant absorbers, the plurality of first resonant absorbers each having substantially a first size and the first absorptive region having a first absorptive response including a first peak absorptive response at a first wavelength, and the second absorptive region including a plurality of second resonant absorbers of the plurality of resonant absorbers, the plurality of second resonant absorbers each having substantially a second size different than the first size, and the second absorptive region having a second absorptive response including a second peak absorptive response at a second wavelength different than the first wavelength,
wherein the first wavelength substantially corresponds to a wavelength of either visible or infrared radiation and the second wavelength substantially corresponds to a wavelength of either visible or infrared radiation,
wherein the substrate is at least partially transparent to radiation, and
wherein the plurality of sensing elements comprise a first sensing element and a second sensing element, the first sensing element being configured to detect incident radiation not absorbed by substantially only the first absorptive region, and the second sensing element being configured to detect incident radiation not absorbed by substantially only the second absorptive region.

17. The apparatus for spectroscopically analyzing radiation recited in claim 16, wherein the plurality of sensing elements comprise Mercury Cadmium Telluride.

18. An apparatus for spectroscopically analyzing radiation, comprising:
a plurality of resonant absorbers disposed on a substrate; and
a plurality of sensing elements disposed beneath the substrate,
wherein the plurality of resonant absorbers comprise metamaterials,
wherein the plurality of resonant absorbers comprise a plurality of absorptive regions including a first absorptive region and a second absorptive region, the first absorptive region including a plurality of first resonant absorbers of the plurality of resonant absorbers, the plurality of first resonant absorbers each having substantially a first shape and the first absorptive region having a first absorptive response including a first peak absorptive response at a first wavelength, and the second absorptive region including a plurality of second resonant absorbers of the plurality of resonant absorbers, the plurality of second resonant absorbers each having substantially a second shape different than the first shape and the second absorptive region having a second absorptive response including a second peak absorptive response at a second wavelength different than the first wavelength,
wherein the first wavelength substantially corresponds to a wavelength of either visible or infrared radiation and the second wavelength substantially corresponds to a wavelength of either visible or infrared radiation,
wherein the substrate is at least partially transparent to radiation, and
wherein the plurality of sensing elements comprise a first sensing element and a second sensing element, the first sensing element being configured to detect incident radiation not absorbed by substantially only the first absorptive region, and the second sensing element being configured to detect incident radiation not absorbed by substantially only the second absorptive region.

19. An apparatus for spectroscopically analyzing radiation, comprising:
a plurality of resonant absorbers disposed on a substrate; and
a plurality of sensing elements adjacent to the plurality of resonant absorbers,
wherein the plurality of resonant absorbers comprise metamaterials,
wherein the plurality of resonant absorbers comprise a plurality of absorptive regions including a first absorptive region and a second absorptive region, the first absorptive region including a plurality of first resonant absorbers of the plurality of resonant absorbers, the plurality of first resonant absorbers each having substantially a first shape and the first absorptive region having a first absorptive response including a first peak absorptive response at a first wavelength, and the second absorptive region including a plurality of second resonant absorbers of the plurality of resonant absorbers, the plurality of second resonant absorbers each having substantially a second shape different than the first shape, and the second absorptive region having a second absorptive response including a second peak absorptive response at a second wavelength different than the first wavelength,
wherein the first wavelength substantially corresponds to a wavelength of either visible or infrared radiation and the second wavelength substantially corresponds to a wavelength of either visible or infrared radiation, and
wherein the plurality of sensing elements comprise a first sensing element and a second sensing element, the first sensing element being thermally coupled to substantially only the first absorptive region, and the second sensing element being thermally coupled to substantially only the second absorptive region.

20. The apparatus of claim 19, wherein the plurality of first resonant absorbers each have substantially a first size and the plurality of second resonant absorbers each have substantially a second size different than the first size.

21. The apparatus of claim 19, wherein the plurality of resonant absorbers comprise discrete structures having one or more of a dipole, split loop, split ring, L-shape, bowtie, and/or fractal bowtie shape.

22. The apparatus of claim 19, wherein the plurality of sensing elements comprise at least one of a thermal light valve array or a microbolometer array.

* * * * *

UNITED STATES PATENT AND TRADEMARK OFFICE
CERTIFICATE OF CORRECTION

PATENT NO. : 8,456,620 B2
APPLICATION NO. : 12/509087
DATED : June 4, 2013
INVENTOR(S) : Kruglick It is certified that error appears in the above-identified patent and that said Letters Patent is hereby corrected as shown below:

On the Title Page, Item (56), under "OTHER PUBLICATIONS", in Column 2, Line 5, delete "et al," and insert -- et al., --, therefor.

On the Title Page, Item (56), under "OTHER PUBLICATIONS", in Column 2, Line 9, delete "et al," and insert -- et al., --, therefor.

On the Title Page, Item (56), under "OTHER PUBLICATIONS", in Column 2, Line 12, delete "et al," and insert -- et al., --, therefor.

On the Title Page, Item (56), under "OTHER PUBLICATIONS", in Column 2, Line 14, delete "et al," and insert -- et al., --, therefor.

On the Title Page, Item (56), under "OTHER PUBLICATIONS", in Column 2, Line 15, delete "Letters" and insert -- Letters, --, therefor.

On the Title Page, Item (56), under "OTHER PUBLICATIONS", in Column 2, Line 17, delete "et al," and insert -- et al., --, therefor.

On the Title Page, Item (56), under "OTHER PUBLICATIONS", in Column 2, Line 17, delete "Metamagmnetism" and insert -- Metamagnetism --, therefor.

On the Title Page, Item (56), under "OTHER PUBLICATIONS", in Column 2, Line 20, delete "Perfecect" and insert -- Perfect --, therefor.

On Title Page 2, Item (56), under "OTHER PUBLICATIONS", in Column 2, Line 1, delete "Wikipedia.," and insert -- Wikipedia, --, therefor.

On Title Page 2, Item (56), under "OTHER PUBLICATIONS", in Column 2, Line 3, delete "modifed" and insert -- modified --, therefor.

Signed and Sealed this
Twelfth Day of November, 2013

Teresa Stanek Rea
*Deputy Director of the United States Patent and Trademark Office*

CERTIFICATE OF CORRECTION (continued)
U.S. Pat. No. 8,456,620 B2

On Title Page 2, Item (56), under "OTHER PUBLICATIONS", in Column 2, Line 4, delete "et al," and insert -- et al., --, therefor.

In the Drawings

In Fig. 11, Sheet 10 of 10, delete " [Processor (1110) uP/uC / DSP] " and insert -- [Processor (1110) µP/µC / DSP] --, therefor.

In Fig. 11, Sheet 10 of 10, in Box "1115" delete "Controler" and insert -- Controller --, therefor. (See Attached Sheet)

In the Specification

In Column 3, Line 58, delete "diameter of" and insert -- diameter --, therefor.

In Column 10, Line 44, delete "(HDD)," and insert -- (HDDs), --, therefor.

In Column 10, Line 46, delete "(SSD)," and insert -- (SSDs), --, therefor.

In the Claims

In Column 15, Line 34, in Claim 4, delete "plurality" and insert -- plurality of --, therefor.

UNITED STATES PATENT AND TRADEMARK OFFICE
CERTIFICATE OF CORRECTION

| | | |
|---|---|---|
| PATENT NO. | : 8,456,620 B2 | Page 1 of 1 |
| APPLICATION NO. | : 12/509087 | |
| DATED | : June 4, 2013 | |
| INVENTOR(S) | : Kruglick | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 532 days.

Signed and Sealed this
Thirtieth Day of December, 2014

Michelle K. Lee
*Deputy Director of the United States Patent and Trademark Office*